No. 795,150. PATENTED JULY 18, 1905.
H. C. MILLER.
FEEDING MECHANISM FOR SEWING MACHINES.
APPLICATION FILED MAR. 12, 1901.
7 SHEETS—SHEET 2.
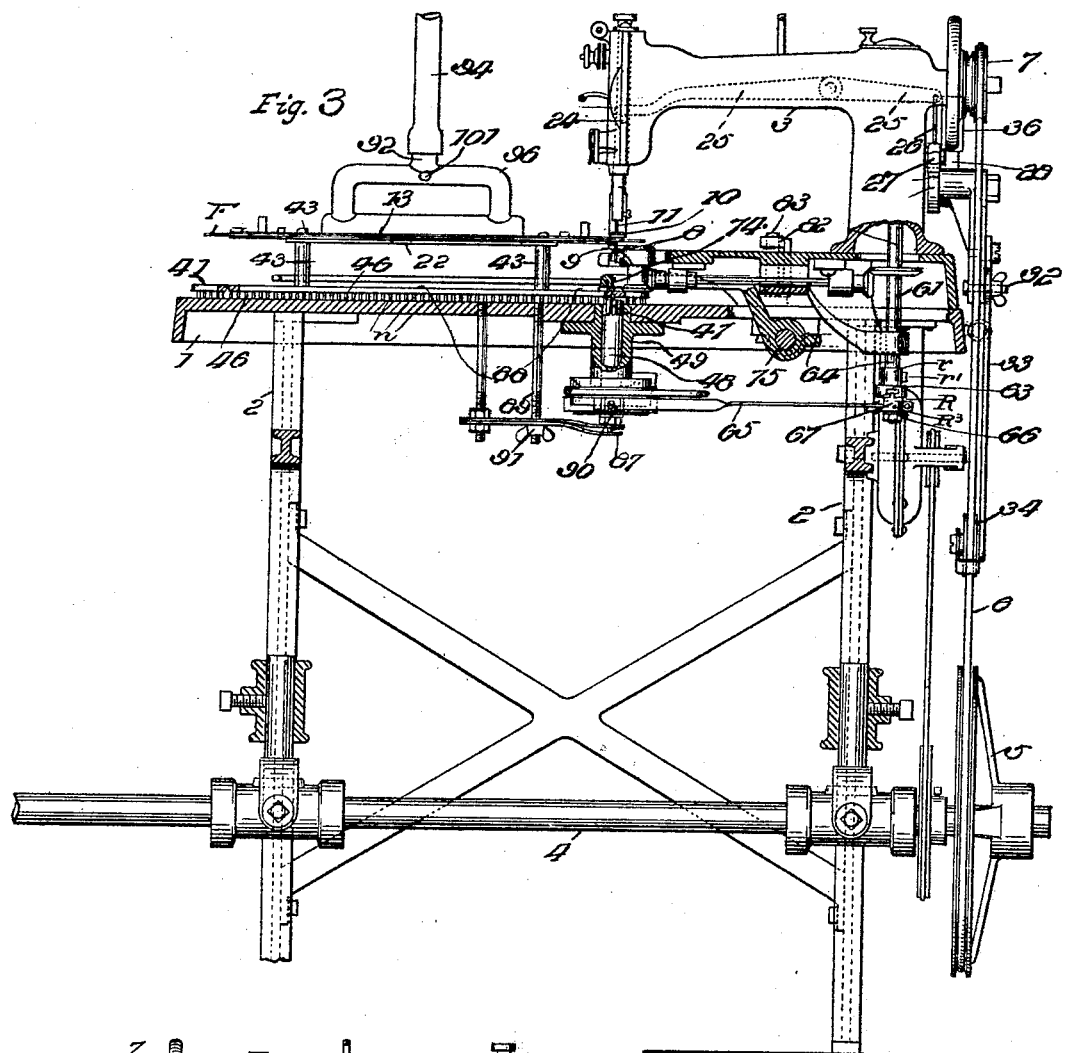
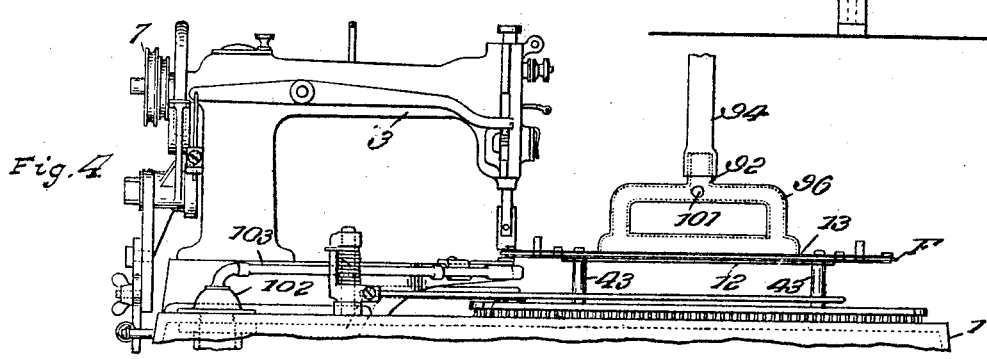
Witnesses,
Henry C. Miller,
Inventor.

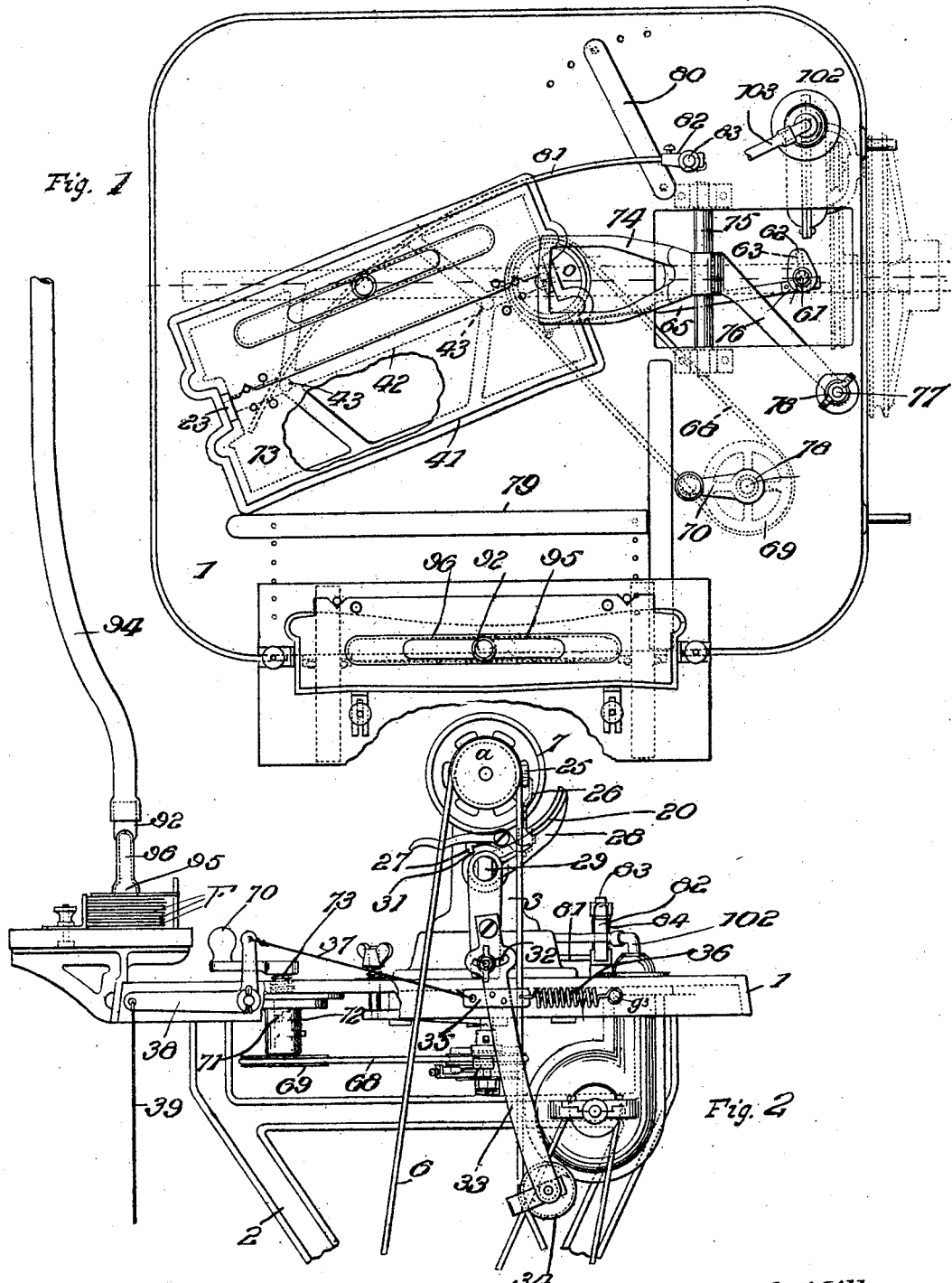

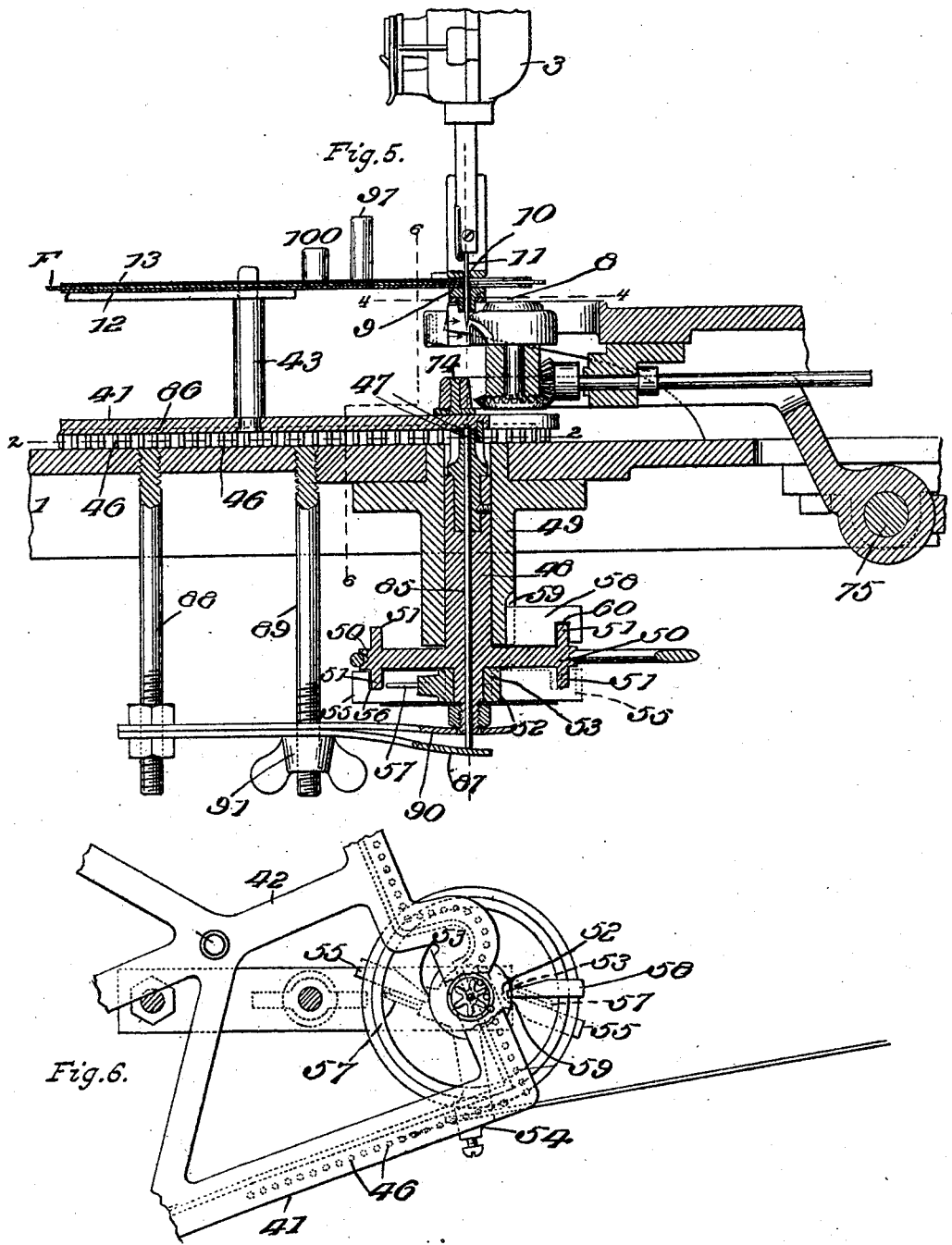

No. 795,150. PATENTED JULY 18, 1905.
H. C. MILLER.
FEEDING MECHANISM FOR SEWING MACHINES.
APPLICATION FILED MAR. 12, 1901.
7 SHEETS—SHEET 4.
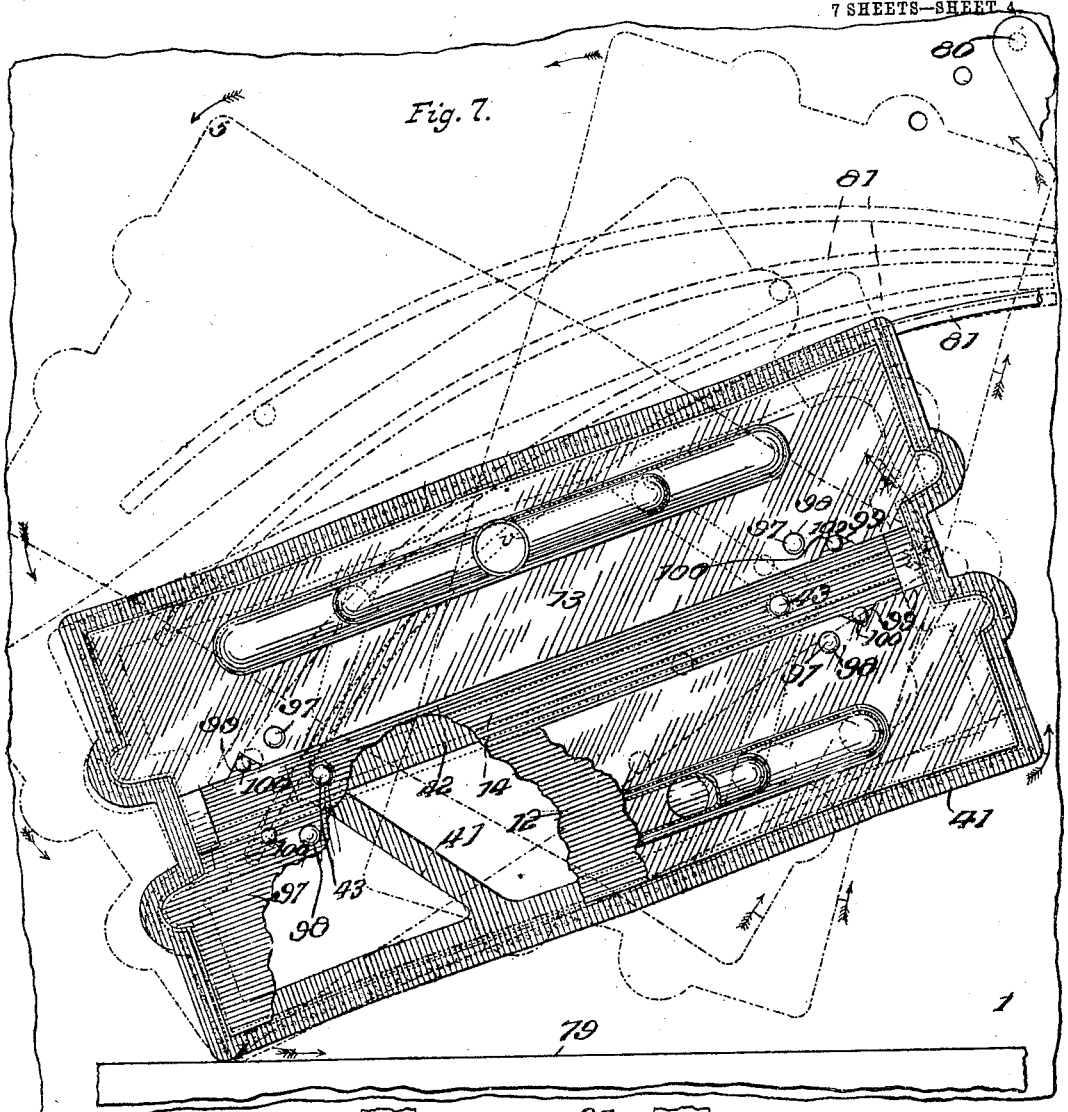
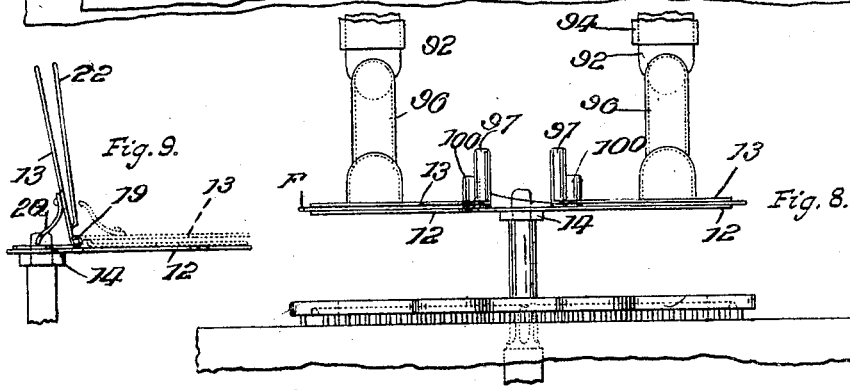
Witnesses
Henry C. Miller,
Inventor
by Alex. Selkirk
attorney No. 795,150. PATENTED JULY 18, 1905.
H. C. MILLER.
FEEDING MECHANISM FOR SEWING MACHINES.
APPLICATION FILED MAR. 12, 1901.
7 SHEETS—SHEET 5.
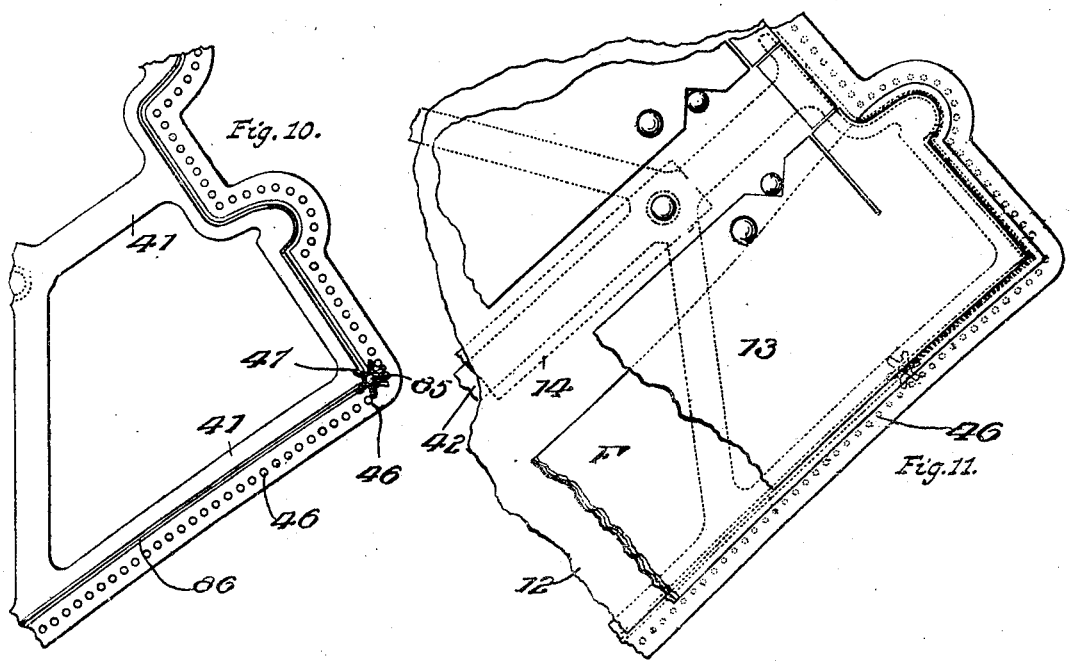
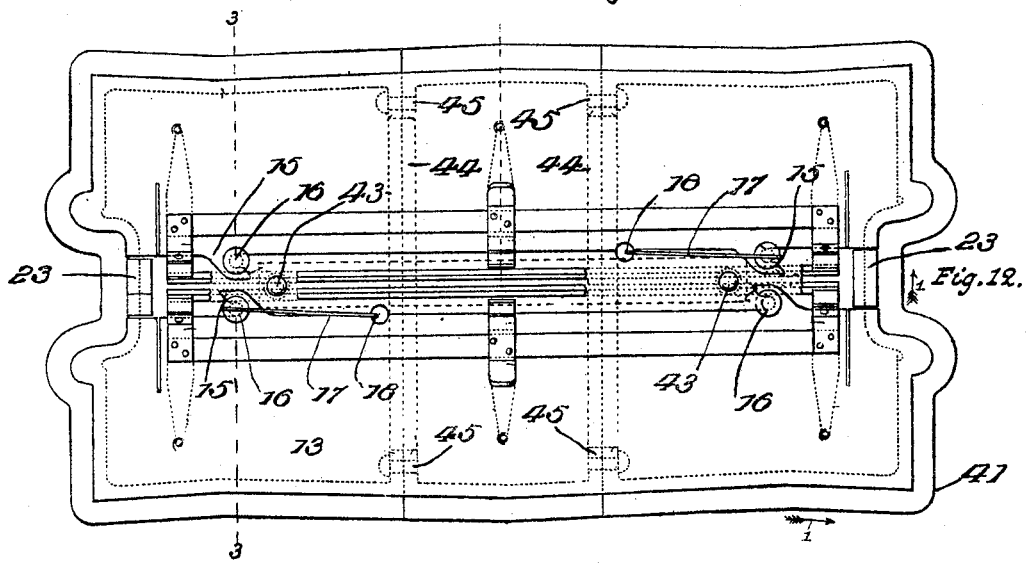
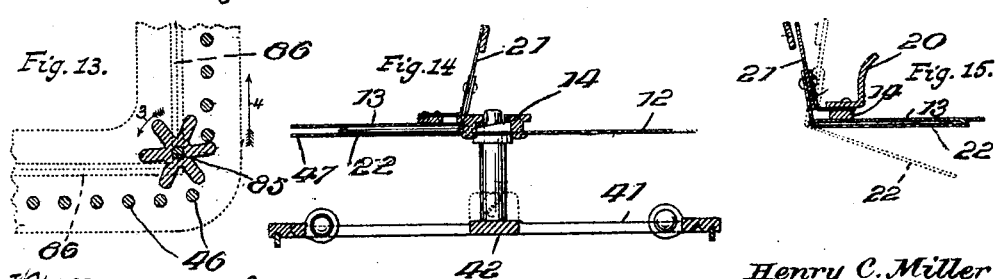

No. 795,150. PATENTED JULY 18, 1905.
H. C. MILLER.
FEEDING MECHANISM FOR SEWING MACHINES.
APPLICATION FILED MAR. 12, 1901.

7 SHEETS—SHEET 6.

Witnesses,
Charles Selkirk
A. Selkirk

Henry C. Miller,
Inventor,
by Alex. Selkirk
Attorney

No. 795,150. PATENTED JULY 18, 1905.
H. C. MILLER.
FEEDING MECHANISM FOR SEWING MACHINES.
APPLICATION FILED MAR. 12, 1901.

7 SHEETS—SHEET 7.

Witnesses
Chas. Norris.
G. R. Thomas

Inventor
H. C. Miller
By
Attorney

No. 795,150.

Patented July 18, 1905.

UNITED STATES PATENT OFFICE.

HENRY C. MILLER, OF WATERFORD, NEW YORK.

FEEDING MECHANISM FOR SEWING-MACHINES.

SPECIFICATION forming part of Letters Patent No. 795,150, dated July 18, 1905.

Application filed March 12, 1901. Serial No. 50,795.

*To all whom it may concern:*

Be it known that I, HENRY C. MILLER, a citizen of the United States, residing at Waterford, in the county of Saratoga and State of New York, have invented new and useful Improvements in Feeding Mechanisms for Sewing-Machines, of which the following is a specification.

The invention relates to an improvement in sewing-machines, and particularly to a new and improved feeding mechanism therefor.

The primary object of the invention is the provisional means for automatically feeding to the stitching mechanism of the sewing-machine the edge margins of fabrics to be sewed together.

The invention, broadly stated, resides in the production of templets designed to securely clamp the fabric and in means for feeding the templets to the said stitching mechanism in a certain arbitrary path whereby to secure a line of stitching of corresponding outline in the fabric.

The invention further comprehends certain details of construction and arrangement of parts made necessary or desirable in order to carry out the primary objects of the invention.

The preferred embodiment of the details of my invention is illustrated in the accompanying drawings, in which—

Figure 16:
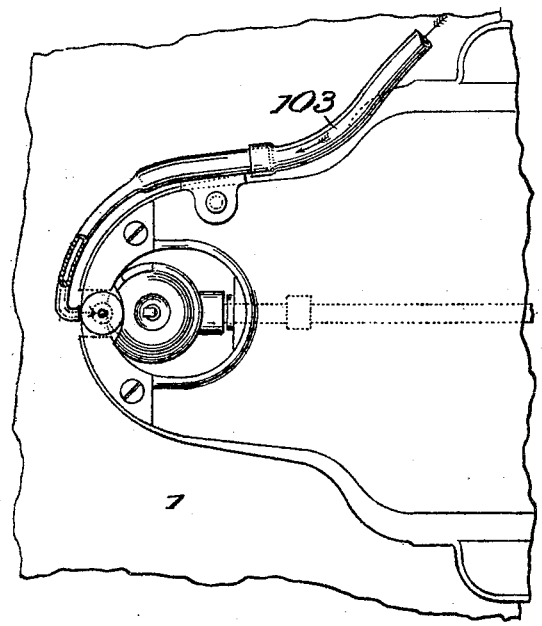
Figure 17:
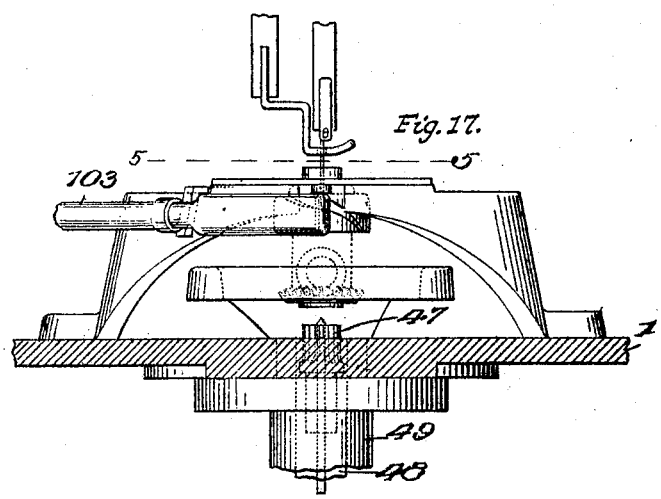
Figure 19:
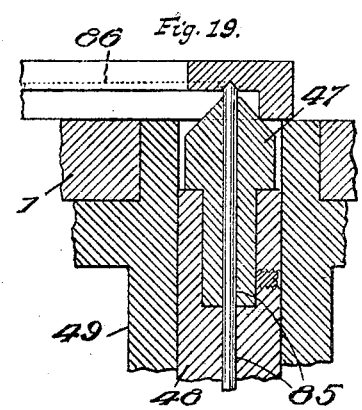
Figure 18:
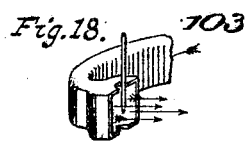
Figure 20:
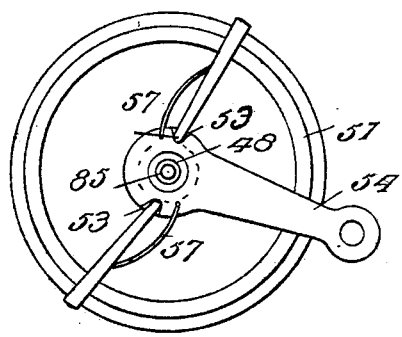
Figure 21:
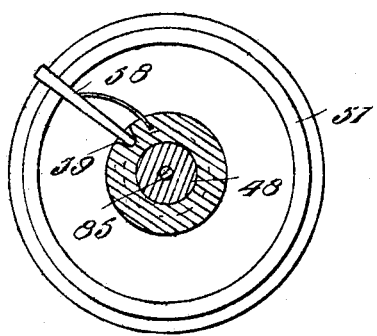
Figure 22:
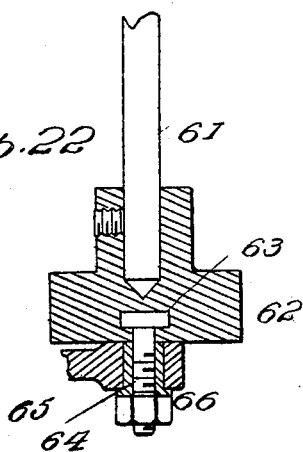
Figure 23:
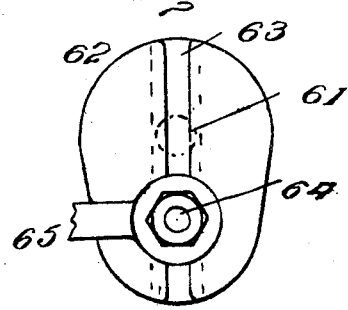

Figure 1 is a plan view of the invention with the machine-head removed. Fig. 2 is an end elevation of the same. Fig. 3 is a section taken on line 1 1 of Fig. 1, the machine-head being shown in place. Fig. 4 is a rear view of the machine-head, the table-feeding mechanism, and the templets. Fig. 5 is an enlarged sectional view on line 1 1 of Fig. 1. Fig. 6 is a plan, broken away, of the templet-carrier feeding mechanism. Fig. 7 is an enlarged view of the templets and carrier therefor, partly broken out, various positions of the parts being shown in dotted outline. Fig. 8 is an end view of the same. Fig. 9 is an end view of one form of templet. Fig. 10 is a broken bottom plan of the templet-carrier, illustrating particularly the feeding mechanism therefor. Fig. 11 is a broken plan of the templet and carrier therefor, the fabric being shown in place. Fig. 12 is a plan of a complete dual templet and carrier therefor, the parts being illustrated in their coöperative relation. Fig. 13 is an enlarged section of a corner of the carrier, taken on line 2 2, Fig. 5, and viewed from beneath, the carrier proper being shown in dotted lines. Fig. 14 is a vertical section of the carrier and dual templets, one of the upper templet-plates being removed, the section being taken on line 3 3 of Fig. 12. Fig. 15 is a section of an upper templet-plate. Fig. 16 is an enlarged plan of the forward portion of the machine-head bed, showing the stitching mechanism and the means for introducing a current of air to the latter. Fig. 17 is an elevation of the forward end of the machine-head, illustrating the means employed for directing a current of air to the stitching mechanism. Fig. 18 is a sectional perspective of the discharge end of the stitching mechanism air-pipe, and Fig. 19 is an enlarged sectional view showing a modified form of carrier feeding mechanism. Fig. 20 is a bottom plan view of the means for intermittently rotating the fabric-holding device. Fig. 21 is a top plan view of the same, partly in section. Fig. 22 is a detail sectional view of the means for altering the intermittent movement. Fig. 23 is a detail bottom plan view of the same.

In the drawings like parts are indicated throughout the several views by similar reference characters, and in the following detail description of the invention the main features of construction will be referred to under separate headings.

*The frame and machine-head.*—Referring particularly to Figs. 3 and 5, 1 represents a machine-table supported by the usual iron framework 2. A sewing-machine head 3 of any usual or preferred construction is fixed on the table and is driven from a power-operated shaft 4 through the medium of wheel 5, belt 6, and belt-wheel 7. The machine-head illustrated is of the class known as the "Wheeler and Wilson vertical hook-shuttle machine;" but other types are equally capable of use with my invention. A bridge-piece 8, fixed to the bed-plate of the machine-head, accommodates a boss or support 9, perforated to receive and guide the needle and in connection with the ordinary pressure-foot 10 serving another important function, hereinafter pointed out. The needle 11, mounted for reciprocation as usual, passes centrally through the pressure-foot and boss, which latter parts are arranged in vertical alinement.

*The templet.*—I have provided means for clamping the fabric and presenting the same to the stitching mechanism, such means being herein termed the "templet" and comprising a lower plate 12 and one or more upper plates 13. In the event duplicate pieces of fabric are to be presented to the needle the duplicate upper plates are required, as will be evident, and in the following description any mention of the upper plate is intended to include and refer to a single or duplicate templet, as may be preferred, it being understood that the upper plates when used in duplicate are exactly similar in construction and operation. The lower plate, which is preferably of thin metal, has a central reinforcing-strip 14 and is of arbitrary outline or shape—that is, has an edge outline similar to the desired line of stitching—and the upper plates 12, which are designed to be removably secured to the lower plates, have a corresponding edge outline. In the use of duplicate upper plates the inner or contiguous edges thereof are formed with latches 15, designed to slidingly engage notch-studs 16 to prevent upward movement of the plates 12, while endwise movement of the plates is prevented by spring-catches 17, secured to studs 16 and engaging openings or notches 18 in the plates 12.

I have provided means for securing the fabric with relation to the upper plate to permit the proper positioning of the fabric in the templet, and such means is illustrated in Figs. 9, 14, and 15. In Fig. 9 I have shown the upper plate 12 as having a hinged connection 19 with the reinforcing-strip 14 of the lower templet-plate, and in Figs. 14 and 15 is illustrated more particularly a means for moving the upper clamping-plate from operative relation with the lower clamping-plate, such means comprising a lifting-handle 20, fixed to the upper clamping-plate, and a spring-strip 21, projecting upward from the clamping-plate and having an extended portion in the shape of elongated retaining-strips 22, which pass beneath the upper clamping-plate and are slightly less in length than the width of said clamping-plates. The operator may by grasping the handle 20 and drawing toward same the spring-strip 21 force the retaining-strip 22 from contact with the plates 12 to permit the insertion of the desired fabric, which latter is held to the under side of the lower plate by the spring-pressure of the retaining-strips on release of the spring-strip 21, as will be fully apparent.

The templet is arranged to receive and clamp between its plates certain pieces of fabric designed to be stitched together and to present same to the needle in a manner to cause the stitching to follow a certain arbitrary path—that is, a path corresponding to the edge outline of the templet. In the stitching operation the edges of the templet-plates pass between the boss 9 and pressure-foot 10, so as to allow the needle to operate on the fabric, which of course projects beyond the edges of the templet. In order to afford the maximum clamping action of the templet-plates at the most desirable point, I prefer to have the margin edges of both the upper and lower plates, or of either, thin and flexible, so that the pressure-foot may force the said edge tightly onto the fabric during the operation of the needle and at the particular point of said operation.

In the use of dual upper templet-plates, which is my preferred construction, I provide means for transferring or guiding the pressure-foot from one upper plate to the next, such means comprising a switch or guide block 23, having a raised or apex center and sloping surfaces therefrom to the adjacent templet-plates 12. This switch serves to guide the pressure-foot from the marginal edge of one templet-plate to the marginal edge of the adjacent templet-plate and in addition thereto serves another important function now to be described.

*The stop mechanism.*—In the use of dual upper templet-plates it will be evident that as the pieces of fabric are in duplicate and are not coextensive with the entire area of the lower templet-plate some means must be provided for stopping the operation of the stitching mechanism during the feeding operation to present a new piece of fabric to the needle. Referring particularly to Figs. 2 and 3, wherein is illustrated such stop mechanism, it will be seen that the vertical bar of the pressure 10 is provided with a projection 24, normally beneath the free end of a lever 25, pivoted to the arm of the machine-head 3. The opposite end of this lever is connected, through the medium of a link 26, to one end of a dog 27. 28 represents a braking-lever pivoted on a stud 29, fixed in the machine-head and carrying on its upper end a brake-shoe 30, positioned for operative connection with belt-wheel 7. The barrel of braking-lever 28, surrounding stud 29, is formed with a notch 31 to receive the end of dog 27. The lower end of the braking-lever is adjustably connected by connection 32 to a bar 33, carrying at the lower end a roller 34, which in normal position operates as a tightener for belt 6. 35 represents a plate secured to bar 33, one end of said plate being connected to a coil-spring 36, fixed at the opposite end to a contiguous part of the frame, while the opposite end of plate 35 is connected to a flexible connection 37 to a crank-lever 38, one arm of which is connected by a depending rod 39 to a foot-treadle. In normal position the dog rests in the notch in the barrel of the braking-lever, as illustrated in Fig. 2, in which arrangement the roller 34 acts to tighten belt 6 in the usual manner, while the brake-shoe 30 is held out of contact with wheel 7. In the feeding of the templet, however, as the pressure-foot 10 rides up the sloping surface of the switch 23 the projection 24 raises lever 25, withdrawing dog 27 from notch 31, allowing spring 36 to move the bar 33 and braking-lever 28 to operative position—that is, to force the braking-shoe 30 into operative contact with wheel 7 and withdraw roller 34 from its tightening position with belt 6. This operation loosens the belt and applies a brake to wheel 7, immediately stopping the operation of the sewing-machine head—that is, the stitching mechanism. A movement of the treadle 40 will restore the parts to normal position, in which position they are locked by the dog dropping into the notch. From this description it will be seen that as the templet is being fed to present a new fabric to the needle the operation of the stitching mechanism will be automatically stopped and that such stitching may be resumed at the will of the operator by simple pressure on the treadle 40.

*The carrier and feeding mechanism.*—It is evident that in the use of the templet some means must be provided for properly supporting, guiding, and feeding the same to the stitching mechanism, and therefore I have devised what I term a "carrier" designed to support the templet and constructed and arranged for arbitrary guidance and feeding.

Referring now particularly to Figs. 1, 3, 5, 6, 7, 10, and 13, my improved carrier comprises a suitable metal plate 41 of skeleton form, having a central stiffening-bar 42 provided with vertical posts 43, tenoned at their upper ends to enter openings formed in the reinforcing-strip 14 of the lower templet-plate, whereby to support the templet in suitable alinement for operation between the boss 9 and pressure-foot 10, as hereinbefore described.

In adapting my improvement for use with templets of varying sizes to accommodate different-sized pieces of fabric it may be found desirable to make the carrier adjustable in length. I provide for such adjustment by making the carrier-plate sectional and providing various sections to be secured between the ends of the parts of the carrier-plate. I have illustrated such an arrangement in Fig. 12, wherein a section 44 is shown attached by bolts 45 to the parts of the carrier-plate. It is to be understood, of course, that the sections 44 may be of a length desired for the particular fabric and that one section 44 may be removed and another substituted as required.

As a means for feeding the carrier-plate I provide the marginal edge thereof with depending teeth or pins 46, and arrange same for coöperation with and engagement by a tooth-pinion 47, supported on the upper end of a shaft 48, mounted for revolution in an elongated bearing 49, fixed in the table 1 of the machine. The pins 46 are arranged in a row contiguous the edge of the carrier-plate and at equal distances apart to produce a regular feed except at the corner or angle of the carrier-plate, at which point the adjacent teeth in the direction of the feed of the carrier are of greater distance apart than are the other teeth, forming a mutilated rack, so that in the operation of the pinion 47 at this point but a single tooth will be engaged thereby, permitting the carrier-plate to turn under the influence of the guiding-pin hereinafter described, as will be clearly understood.

The feed-pinion 47 may be operated by any suitable mechanism for intermittently rotating the same to feed the carrier a stitched length at a time; but I have devised a suitable mechanism for accomplishing this result, wherein 50 represents a revolving wheel fixed on the lower end of shaft 48, which wheel is provided with vertical annular flanges 51. 52 represents an operating-sleeve loosely mounted on the projecting stem of shaft 48, said sleeve being provided at opposite points with notches 53. 54 represents an arm for operating the sleeve. 55 represents clutches with their inner ends normally seated in the notches 53 and formed with notches 56 to receive the depending annular flange 51 of wheel 50, springs 57 operating to hold said clutches in normal position. 58 is a retaining-arm having its foot end seated in a notch 59 formed in the side of the bearing 49, and being formed with a notch 60 to receive the upper annular flange 51 of wheel 50.

The mechanism just described is operated to intermittently revolve wheel 50 by any mechanism designed to impart a reciprocatory movement to arm 54. My preferred construction for such mechanism is clearly illustrated in the drawings, particularly Figs. 1 and 3, wherein 61 represents a shaft, preferably an elongation with the vertical shaft of the sewing-machine head, carrying at its lower end a stitch-regulating device to mediately control the operation of the pinion 47, and thereby regulate the length of the stitch. This stitch-regulating device comprises a pivot-holding piece 62, adjustably secured on shaft 61 and formed with a T-slotway 63, which slotway receives a head of a crank-pin 64, secured to a connecting-rod 65, connected at its opposite end to arm 54. I prefer to introduce a clamping-washer 66 between the neck of the pivot 64 and the connection of the latter with the rod 65, which connection is preferably in the form of a knuckle 67. This washer operates to tightly clamp the sides of the pivot-holding piece 62 and prevent the ⸺ter from shifting in either direction in relation to the knuckle. It is evident that movement of the knuckle to or from the shaft 61 will decrease or increase the movement of rod 65, and thereby increase or decrease the length of the stitch.

I also prefer to arrange suitable mechanisms for operating the feed-pinion 47 by hand to permit the operator to move the carrier to any preferred situation in relation to the needle, as may be required. My preferred construction to this end is illustrated in Figs. 1 and 2, wherein 68 represents a belt connecting wheel 50 and a drive-pulley 69, fixed on a shaft supported in bearings depending from table 1. The shaft supporting the pulley is preferably made in sections, on one of which the pulley is fixed, and on the opposite end of the other is fixed a crank-handle 70. The sections of the shaft are designed to be locked together for revolution by the crank-handle through the medium of a tooth 71, engaging a tooth 72 on the other section. A spring 73 normally holds the sections apart and the teeth disengage. Pressure on the crank-handle will cause an engagment with the teeth, permitting the operation of the parts through the revolution of the crank-handle.

I have found it advisable to provide a keeper for the carrier, designed for engagement therewith at the point of operation at the pinion 47 to prevent the carrier from rising from operative engagement with the pinion. This keeper comprises a stirrup-shaped arm 74, extending back beneath the bed of the machine-head and pivotally mounted on a transverse stud 75. 76 represents an integral rearward extension of said arm 74, the free end of which is secured to a stud 77, passing upward through table 1 and threaded to receive an adjusting-nut 78, through the medium of which the bearing end of arm 74 may be forced with greater or less pressure onto the carrier 41.

I also prefer to provide suitable guides for the carrier in movement, such being illustrated in Fig. 1 and comprising a corner-guide 79, preferably a metallic strip secured to the table, and against the straight edge of which the edge of the carrier is guided in operation. 80 represents a second guide, adjustably secured to the table 1, as illustrated, which latter guide receives and guides the edge of the carrier in its movement during a certain part of the feeding. 81 represents an elastic presser or guide, being a spring-strip secured at one end to a head 82, mounted on a stud 83, fixed in table 1 and controlled in operation by a coil-spring 84, as is well understood. The free end of guide 81 projects beyond and bears against one of the posts 43, as shown in Fig. 7. The guide 81 is shown of considerable length to adapt it for service with templets of varying lengths. Its operation is fully apparent from the description and drawings.

I have just described the mechanism for feeding the carrier-plate, but it is evident that some means must be provided for guiding said plate to control its path of movement under the influence of the feeding mechanism.

Referring particularly to Figs. 5 and 10, wherein suitable means for guiding the carrier-plate is clearly illustrated, 85 represents a guiding-pin passing centrally through shaft 48, with its upper end projecting beyond the surface of pinion 47. Coöperating with the projecting end of this pin is a guiding-groove 86 of arbitrary outline formed in the under side of and contiguous the marginal edge of the carrier 41. By means of the groove and pin the carrier, under the influence of the feeding mechanism, moves in a predetermined path and presents the templet and fabric clamped thereby to the needle for stitching. In order to insure accurate and operative registry of the pin and groove, I prefer to provide an elastic support for the pin, comprehending an elastic arm 87, adjustably secured to a post 88, depending from the table and embracing a second post 89, also depending from the table, the free end of the arm resting beneath the guiding-pin. The pinion-shaft 48 is also elastically supported by a similar arm 90, supported on posts 88 and 89, with its free end resting beneath the lower end of the shaft. A thumb-nut 91 on the lower screw-threaded end of post 89 serves to regulate the tension of the arms 87 and 90 in an obvious manner, it being noticed that the bearing 49 does not extend to the surface of wheel 50, whereby longitudinal movement of the shaft 48, under the influence of the spring-arm 90, will be permitted.

*Automatic fabric-feeding mechanism.*—I have hereinbefore described means for securing the fabric in place in the templet, including the manual placing of the fabric, yet in many instances where the articles to be stitched are to be produced in large quantities without change I prefer to employ mechanically an automatic operable means for supplying the fabric-templet with material. Such mechanism comprises a draft-nipple 92 of an exhaust-box 93, connected with the upper side of one of the upper clamping-plates 12. This device is connected with a suitable exhausting apparatus (not shown) by a tube 94. Suitable exhaust-ports 95 open through the clamping-plate and operate in a well-known manner to hold the fabric to the plate. For convenience in handling I prefer to provide a suitable handle 96 for the device, which handle is of tubular form to connect with the exhaust-box. In the use of the device the fabric arranged in suitable piles is picked up piece by piece as desired and the clamping-plate, with the attached fabric, placed on the lower clamping-plate. To prevent disarrangement of the correlation of the upper and lower clamping-plates in the use of my pneumatic device, I provide posts 97, projecting upward from the carrier and through the lower clamping-plate, the upper clamping-plate being formed with openings 98 to receive the posts. The upper clamping-plate is also formed with marginal notches 99, designed to engage studs 100, fixed on the lower clamping-plate to serve as guides for the positioning of said upper clamping-plate. A suitable vent 101, Fig. 3, is provided, preferably in the hollow handle 96, to permit control of the suction by the operator.

*Air-blast for shuttle.*—In connection with the improvements hereinbefore described I prefer to provide my machine with means for delivering an air-blast into the shuttle of the sewing-machine proper to distend the loop, whereby to prevent an irregularity in the stitching. The mechanism comprises a blower 102, suitably driven, and a flexible conduit 103, leading to a point opposite the needle. The discharge end of the conduit may be in the form of a straight line from side to side, as illustrated in Fig. 16, or in the form of an enlarged opening, (shown in Fig. 18,) the object being to direct the current of air against the needle and reflect same on each side of and past the needle and against the thread of the loop to keep the latter spread in open form for the passage of the shuttle. The air after such operation operates to clear the stitching mechanism of lint or the like. If desired, air may be led from the conduit 103 to other parts of the stitching mechanism or machine for cooling such parts or for diffusing refuse.

The fabric F is inserted between the templet-plates 12 and 13 either manually or by the mechanical means hereinbefore described and the mechanism started, which operates to move the carrier, with the supported templet and fabric in an arbitrary path toward the stitching mechanism, the marginal edges of the templet being clamped between the boss 9 and pressure-foot 10 contiguous the needle, so that the latter may operate on the fabric just outside the edge of the templet-plates, thus securely clamping the templet-plates onto the fabric at the point of operation of the needle. In the use of dual templets the pressure-foot in moving from one to the other, or rather in the presentation of the second templet-plate to the needle, the switch 23 forces the pressure-foot upward, operating, as hereinbefore described, to stop the operation of the needle. Hence no stitching occurs until the stop mechanism is manually released at the time the edge of the fabric in the second templet is presented to the needle.

The fabric-holding means and its support must be mounted to be turned from the outer edge to permit the means for operating it to present its outer edge adjacent the needle. By thus locating the parts the fabric-holding means may be of any arbitrary outline, and for convenience in describing the location of the connection I have used the term in the claims "distanced from the center" in contradistinction to a fabric-holder operated on a central pivot which would not allow of stitching arbitrary outlines.

The manual means for feeding the carrier permits the operator to position the latter as desired, providing against improper stitching and other disadvantages.

Having described my invention, what I claim, and desire to secure by Letters Patent, is—

1. In a sewing-machine in combination with a reciprocating needle, a fabric-clamping device adapted to turn comprising two clamps having their outer edges of arbitrary outline corresponding with the desired line of stitchings, said clamping device being adapted to be moved progressively with its edges adjacent to the path of the needle, a clamping presser-foot through which the needle reciprocates, said foot pressing upon the outer edge of the clamping device, and mechanism for automatically feeding and turning said clamping device, whereby a predetermined outline is stitched.

2. In a sewing-machine in combination with a reciprocating needle which operates through an opening in the machine-bed, of a fabric-clamping device adapted to turn comprising two clamping-plates having their outer edges of an arbitrary outline in correspondence with the desired line of stitchings, a presser-foot through which the needle reciprocates, and mechanism for feeding and turning the said fabric-clamping device to progressively present its edges adjacent the needle.

3. In a sewing-machine, the combination with a reciprocating needle, a yieldingly-supported presser-foot formed with a passage-way for the needle, a fabric-clamping device adapted to turn comprising a lower clamping-plate and an upper clamping-plate, the edges of the clamping-plates being of arbitrary outline to correspond with the desired line of stitching, a support below and adapted to form a rest for the lower plate of said clamping device, said support being formed with a vertical perforation for the needle, the marginal edges of the clamping device being held between the support and presser-foot, and mechanism to feed and turn the clamping device to progressively present its edges adjacent the needle.

4. In a sewing-machine, the combination with a reciprocating needle, an elastic presser-foot formed with a passage-way for the needle, a support, a two-plate clamping device having its margin of arbitrary outline to correspond to the line of stitching desired, means to progressively feed the clamping device between the support and presser, and means to guide the marginal edge of the clamping device during the stitching operation.

5. In a sewing-machine, a fabric-clamping device adapted to turn comprising two plates having a marginal edge of arbitrary outline, the upper one of said plates being removable to permit the insertion of the desired fabric, a reciprocating needle and means for clamping the plates of the clamping device together immediately contiguous the needle, said means serving to guide the needle in operation, and means to feed and turn the clamping device to progressively present its edges adjacent the needle.

6. In a sewing-machine, the combination with a reciprocating needle, mechanism for operating said needle, a yieldingly-mounted presser formed with a passage-way through which said needle may work, a support below said presser and provided with a passageway in alinement with the axial line of the needle, of dual fabric-clamping devices shaped to correspond with the desired line of stitching and adapted to be moved between said presser and said support, and having each a lower clamping-plate and a removable upper clamping-plate, means for securing each of said upper clamping-plates to the lower clamping-plates, a device between the respective ends of the said fabric-clamping device which is moved between the elastic presser and the support below to elevate said presser, and mechanism between the said presser and the mechanism adapted to operate the needle, whereby said needle may be stopped in its movement while the edge margins of one of the said dual clamping devices is moving away from the needle and the other clamping device is moving to the same.

7. In a sewing-machine provided with a reciprocating needle, a dual fabric-clamping device, adapted to move fabrics progressively to the needle in lines the stitchings are to be made, formed by the combination with a lower plate, adapted to serve the purpose of two lower clamping-plates, and two upper clamping-plates which are each a duplicate of the other in size, proportions and form of the outer edges of their respective edge margins, switching devices secured to the opposite ends of the said lower plate and between the two upper clamping-plates and the terminals of the edge margins thereof, retaining devices adapted to hold said removable clamping-plates from shifting in relation to said lower clamping-plates, mechanism to feed said clamping device progressively to present the margin of the clamped fabrics to the needle, and mechanism adapted to stop the motion of the needle during the passage of said switches past the needle.

8. In a sewing-machine, the combination with a fabric-clamping device comprising a stationary lower clamping-plate and an upper clamping-plate provided with fabric-clamping means and removably secured to the lower clamping-plate, said clamping means securing a body of fabric preparatory to its being stitched in a line adjacent the outer edges of the clamping-plates, a table adapted to support a pack of bodies of fabric of like form and size to be stitched, mechanism adapted to be operated in connection with said removable upper clamping-plate for transferring the topmost body of fabric from said table to said lower clamping-plate, and mechanism adapted to hold said upper clamping-plate from shifting in relation to the lower clamping-plate.

9. In a sewing-machine, the combination with a reciprocating needle, of a clamping device adapted to turn comprising a lower plate and two dual upper clamping-plates adapted for coöperation with the lower clamping-plate, and means for feeding and turning the clamping device to present its edges adjacent the needle.

10. In a sewing-machine, provided with a reciprocating needle, a yieldingly-mounted presser formed with a needle-passage, a support formed with a needle-passage, and a fabric-clamping device comprising an upper and a lower clamping-plate having each a like edge margin adapted to be moved simultaneously between the said support and presser, and suitably clamp the outer-edge margin of the fabric between said clamping-plates, of a platform, a carrier supported on the latter and adapted to support the said fabric-clamping device and move its edge margins between the said support and elastic presser, and mechanism adapted to actuate said carrier.

11. In a sewing-machine, the combination with a reciprocating needle, of a clamping device comprising a lower plate and duplicate upper plates to coöperate with said lower plate, a switching device between the duplicate upper plates, and means for feeding the clamping device to the needle.

12. In a sewing-machine, the combination with a reciprocating needle, a clamping device adapted for securing duplicate articles to be successively stitched, means for feeding said clamping device to the needle, and means carried by the clamping device to stop the operation of the needle during a movement of the clamping device to present a new article to the needle.

13. In a sewing-machine, the combination with a reciprocating needle, of a clamping device adapted to turn to carry an article to be stitched, a support formed with an opening to permit operation of the needle, said support forming a rest for the edge of the clamping device, a presser-foot formed with a needle-opening and arranged in vertical alinement with the support and coöperating therewith to hold the clamping device in operative relation to the needle, and means for progressively feeding and turning the clamping device to present the edges thereof adjacent the needle.

14. In a sewing-machine provided with a reciprocating needle, a table relatively forward of said needle, a vertical guiding-pin projected upward toward the needle, and having its axial line coincident with that of said needle, of a carrier adapted to operate a fabric-clamping device having outer edges which are in correspondence with lines of stitchings to be produced by said needle in the fabric clamped thereby, guiding-ways adapted to coact with said vertical guiding-pin to hold said carrier in proper relation to the needle and adapt it to carry the outer edge margin of the fabric clamped by the fabric-clamping device, to the needle.

15. In a sewing-machine, the combination with a reciprocating needle, a clamping device adapted to turn for holding side by side duplicate articles to be stitched, said device having an outline corresponding to the desired outline of the finished article, mechanism for automatically feeding said clamping device and turning said clamping device whereby a predetermined outline is stitched, and mechanism located on the clamping device and between the two articles being stitched for automatically stopping the sewing-machine.

16. In a sewing-machine, the combination with a reciprocating needle, a fabric-clamping device, a carrier supporting the clamping device, a groove of arbitrary outline formed in the carrier, means for feeding the carrier, and means operative with said groove for controlling the path of movement of the carrier.

17. In a sewing-machine, the combination with a needle, a fabric-clamping device of arbitrary outline arranged in operative relation to the needle, a carrier therefor, a groove in the carrier of similar outline to the clamping device, a pin for coöperation with said groove, and means for feeding the carrier to the needle.

18. In a sewing-machine adapted to stitch outer edge margins of fabrics which are mechanically guided and fed to the stitching mechanism of the same, the combination with a table adjacent said stitching mechanism, a carrier mounted on said table and adapted to be moved horizontally thereon and provided with a suitable guiding-way having a form of line in correspondence with that of the stitching to be produced in the fabric, a stationary vertical guiding-pin which is projected upward and is in alinement with the axis of the needle of said stitching mechanism and adapted to coöperate with the groove in the carrier, and an actuating device revolving about the center of the said guiding-pin and actuating said carrier.

19. In a sewing-machine, the combination with a fabric-clamping device adapted to guide and feed bodies of fabric beneath the needle of the stitching mechanism thereof, a table adjacent the needle, a carrier adapted to support and carry the said fabric-clamping device and formed with a guiding-way and facing said table and having an outline corresponding with the lines of stitching the fabric is to receive and having a rack-bar on a line parallel with that of said guiding-way, of a guiding-pin which is stationary in relation to said way and projected above the upper surface of said table with its axis in alinement with that of the said needle, and coöperating with the said guiding-way for holding the carrier from moving away from the needle, and a gear-wheel revolving about the axis of said pin and guide and coöperating with said rack-bars to actuate the said carrier and cause the fabric-clamping device to feed the outer edge margin of the clamped fabric progressively to the needle.

20. In a sewing-machine, the combination, with a stitching mechanism and a table relatively forward of the stitching mechanism, a carrier adapted to support and move a fabric-clamping device which is adapted to carry the edge margin of a body of fabric progressively to the needle of said stitching mechanism, said carrier being formed with a groove-form way adapted to guide the fabric fed to the needle, a guiding-pin projected above the surface of the said table and in alinement with the needle, an actuating device revolving about the axis of said guiding-pin, an engaging device adapted to be engaged by the said revolving actuating device, and a keeper bearing on an upper side surface of said carrier at a point directly over said guiding-pin.

21. In a sewing-machine the combination with a needle, a table forward of said needle, a carrier having an orbital movement on said table, and formed with a groove-form guiding-way, of a vertically-movable guiding-pin having its axial line coincident with the axial line of the needle, a suitable bearing which is adapted to retain said guiding-pin, and an elastic support applied to the lower end of said pin.

22. In a sewing-machine, the combination with a needle, a table forward of said needle, a carrier having an orbital movement on said table, and formed with a grooved-form guiding-way, of a guiding-pin having its axial line coincident with that of the needle, a bearing loosely receiving said guiding-pin and retaining it in position, an elastic support applied to the lower end of said pin, and a mechanism to be operated to increase and lessen the elastic upward pressure of said guiding-pin support.

23. In a sewing-machine the combination with a reciprocating needle, a table forward of said needle, a carrier having an orbital movement on said table, said carrier being formed with a groove-form way, a stationary vertically-projected guiding-pin working in said groove and having its axial line coincident with that of said needle, an actuating device revolving about a center which is coincident with the center of said guiding-pin, and an engaging device in a line at the lower side of the carrier and corresponding with the line on which the stitchings are to be produced in the fabric, and parallel with the line of the groove-form guiding-way in which said guiding-pin works, and adapted to coact with the revolving actuating device, a bearing loosely holding the shaft of said actuating device vertical, an elastic support which is applied to the said shaft so as to force it vertically toward the lower side of said carrier, mechanism adapted to be operated to increase the upward pressure of said elastic support, and a keeper having bearings on the upper side of said carrier.

24. In a sewing-machine, the combination with a carrier adapted to be moved in an orbital direction on a table, said carrier being formed in its lower side with a groove-form guiding-way, a guiding-pin working in said guiding-way, a rack-bar running parallel with said guiding-way, said rack-bar being mutilated at predetermined points, a revolving gear-wheel having its center of motion in alinement with the axis of the guiding-pin and adapted to engage the rack-bar.

25. In a sewing-machine, the combination with a carrier, a fabric-clamping device, means for progressively moving the fabric-clamping device to present the outer edge margin of a body of fabric to the needle of the machine, a table supporting said carrier, an actuating mechanism adapted to move said carrier over the top surface of said table, a corner-guide connected with said table, the outer end corners of the carrier being guided against the corner-guide, and a presser adapted to have bearings against the clamping device to maintain the position of the carrier and the clamping device while being moved.

26. In a sewing-machine, the combination with a table adjacent the needle of the machine, a fabric-clamping device adapted to clamp a body of fabric with an edge margin portion thereof projecting outward past the outer edge of said clamping device, a carrier supported on said table and supporting said fabric-clamping device, mechanism adapted to impart movement to said carrier from a point in alinement with the axis of the needle, and mechanism adapted to guide the carrier to present the edge margin of the clamped body of fabric to the needle in a line corresponding to the line of outer edge of said clamping device.

27. In a sewing-machine, the combination with a reciprocating needle, a drive-shaft operating the needle-bar carrying said needle, a vertical shaft, mechanism communicating motion from the drive-shaft to the vertical shaft, a table, a fabric-clamping device, a carrier adapted to support and move the outer edge margins of the fabric-clamping device adjacent and progressively past the said needle with the outer edge margins of fabric to be stitched passing beneath the needle, a guiding mechanism between the table and said carrier, and a revolving actuating device rotating around a center which is in alinement with the axis of the needle.

28. In a sewing-machine, the combination with a fabric-clamping-device carrier, a table supporting the same adjacent the needle, a guiding mechanism guiding the movements of the said carrier on said table, a carrier-actuating device revolving about a center which is in alinement with the axis of the needle, a revolving shaft which is actuated by gearing mechanism driven by the main shaft of the machine, a crank-pin connected to said shaft, a friction-clutch gear mounted on the shaft of the revolving carrier-actuating device, and adapted to be operated intermittently, a reciprocating actuating-bar which is pivotally connected at one end to said crank-pin and having its opposite end suitably connected to an oscillating part of said friction-clutch gear.

29. In a sewing-machine, the combination with a needle, of a fabric-clamping device arranged to secure duplicate articles side by side, a carrier therefor, a table supporting the carrier, means for guiding the carrier in movement, means adapted to move the carrier intermittently to a distance equal to the length of stitch, and mechanism continuously driven and adapted to impart the intermittent motion to said means.

30. In a sewing-machine, the combination with a table adjacent the needle of the machine a fabric-clamping device, a carrier adapted to carry adjacent to the needle the edge margins of the fabric-clamping device, a revolving carrier-actuating device, a shaft having its axis in alinement with the axis of the needle and revolving said carrier-actuating device, a friction-clutch comprising toggles and an operating-arm mounted on the lower end of said shaft, a bar connected to the toggle-operating arm, an adjustable crank-pin pivoted on the opposite end of said bar, and a revolving shaft carrying said adjustable crank-pin.

31. In combination, a sewing-machine provided with a reciprocating needle, an article holding and carrying device, means guiding the edge of said holding device adjacent the needle, said means comprising a member having a groove and a coöperative guiding element coacting with the groove, the center of the coöperating element being in alinement with the needle, and means for moving the holding device.

32. In a sewing-machine, the combination with a carrier having an orbital form of movement on a supporting-table and adapted to carry a fabric-clamping device so that its edge margin is made to progressively move adjacent and pass the needle of the machine, an actuating device adapted to move said carrier on its supporting-table, mechanism adapted to guide the movement of said carrier, and a mechanism operated by hand for revolving said carrier-actuating mechanism.

33. In a sewing-machine, a reciprocating needle, a table adjacent the needle, a fabric-clamping device comprising clamping members arranged side by side, a carrier formed with a groove, a vertical shaft having its axis in alinement with the axis of the needle and formed with a perforation throughout its whole length, an engaging device parallel with the groove, an actuating device adapted to engage said engaging devices, a sleeve-form bearing holding said shaft vertical, an elastic support on which the shaft rests, a guide-pin within the perforation with the upper end thereof entered in the groove and an elastic support on which the foot end of the guide-pin rests.

34. In a sewing-machine, the combination with a needle, a table adjacent said needle, a dual fabric-clamping device comprising two lower duplicate clamping-plates, and two removable upper clamping-plates having their outer edges of form of outline corresponding with the line of stitchings the clamped fabric is to receive in its outer edge margin and corresponding with the form of edge of said lower clamping-plates, a carrier supported on said table, and mechanism adapted to move the same in an orbit that it may carry the outer edges of the duplicate fabric-clamping device to the needle, and mechanism operable to hold the upper clamping-plate onto the body of fabric.

35. In a sewing-machine, the combination with a table adapted to support a pack of bodies of fabric to be stitched at their edge margins, a table adjacent the needle, a dual fabric-clamping device of which the upper clamping-plates thereof are removable, a carrier adapted to be moved in an orbit over the table in front of the needle and adapted to carry an outer edge of one of the two duplicate fabric-clamping devices progressively adjacent the needle, while the upper removable clamping-plate of the other duplicate fabric-clamping device is removed from the lower plate of the same, a mechanism operating through a removable upper clamping-plate to pick up and hold flat against the lower side of said plate a body of fabric, and deposit the same on an unoccupied lower clamping-plate with the edge margin of the fabric to be stitched projected out beyond the line of outer edge of the two clamping devices, at the time the outer edge margin of the body of fabric between the other duplicate fabric-clamping device is being moved to the needle.

36. In a sewing-machine having a reciprocating needle, a table adjacent the needle, duplicate fabric-clamping devices which are side by side and suitably connected and having each a removable upper clamping device which is a duplicate of the other and may be employed interchangeably with either of the duplicate lower clamping-plates, of a carrier supported on said table and having an orbit of movement which is adapted to carry the outer edges of either of said duplicate clamping devices progressively adjacent the needle with the outer edge margin of the clamped fabric beneath the latter, and a mechanism operated by pneumatic force and adapted to pick up a body of fabric to be stitched and hold it against the lower side of the one of said removable clamping-plates which may be employed for transferring to the unoccupied one of the two lower clamping-plates the body of fabric to be stitched, a vent operated to effect a release of the fabric from pneumatic force and upper clamping-plate.

37. In a sewing-machine, the combination with a stitching mechanism, a driving mechanism, a fabric-holding mechanism, a feeding mechanism for feeding and turning the holding mechanism to progressively present the edge margin of the fabric to said stitching mechanism, a guiding mechanism adapted to automatically guide the passage of the edge margin of the fabric to said needle, and mechanism operated by the driving mechanism for operating said feeding mechanism.

38. In a sewing-machine, the combination with a needle, of a fabric-clamping device, comprising a lower plate and two dual upper plates arranged side by side, a carrier arranged below and adapted to support the clamping device, means for guiding the carrier in an arbitrary path, and means for feeding the carrier to present the edge of the clamping device adjacent the needle.

39. In a sewing-machine, the combination with a reciprocating needle, of a clamping device arranged to hold duplicate articles to be stitched, means for feeding said clamping device to successively present the articles carried thereby to the needle, mechanism to stop the operation of the needle at predetermined intervals, and a device to actuate said mechanism in the movement of the clamping device.

40. In combination, a sewing-machine having a reciprocating needle, a templet of arbitrary outline for holding a piece of fabric to be stitched at its edges, and a vertical shaft and coöperating mechanism operating the templet to present the edge of the fabric to the needle, the center of the shaft being in alinement with the needle.

41. In combination a sewing-machine having a reciprocating needle, a templet of arbitrary outline for holding a piece of fabric to be stitched at its edges, means including a member in vertical alinement with the needle for guiding the templet to present the edge of the fabric to the needle, and means for operating the templet.

42. In combination, a sewing-machine having a reciprocating needle, a templet for holding a piece of fabric to be stitched at its edges, a shaft and coöperating mechanism for moving the edge of the templet past the needle for stitching the fabric, said shaft being in alinement with the needle, and means imparting an intermittent movement to the shaft.

43. In combination, a sewing-machine having a reciprocating needle, and a presser, a templet of arbitrary outline, a support for the templet and means including a member in alinement with the needle for operating the templet to present the edges of the fabric held thereby to the needle, the presser holding the templet against its support.

44. In combination, a sewing-machine having a reciprocating needle, a carrier, templets supported on the carrier, means for revolving the carrier, and means for guiding the carrier during said revolutions to present the edges of the templet adjacent the needle, said guiding means being in alinement with the needle.

45. In combination, a sewing-machine having a reciprocating needle, a carrier having a guide of arbitrary outline, a templet on the carrier of the outline of the guide on the carrier, and means for moving the carrier and templet intermittently, the edge of the templet being adjacent the needle in its movement.

46. In combination, a sewing-machine having a reciprocating needle, of a templet comprising a lower plate and two dual upper clamping-plates, and means for feeding the clamping device to the needle, said means including a member in alinement with the needle.

47. In combination, a sewing-machine having a reciprocating needle, dual fabric-holding templets, a switching device, and means for feeding the templets to the needle.

48. In combination, a sewing-machine provided with a reciprocating needle, a templet for holding fabric, said templet having an outline corresponding to the desired outline of the finished article, and revolving means for feeding said templet to cause the needle to follow the outline, said means including a member having its axis in vertical alinement with the needle.

49. In combination, a sewing-machine having a reciprocating needle, a templet for holding fabric, a carrier supporting the templet, a guide of arbitrary outline, means for feeding the carrier, and means coöperating with the guide for controlling the path of movement of the carrier.

50. In combination, a sewing-machine having a reciprocating needle, a templet for holding fabric, moving means for imparting movement to the templet, said means including a member in alinement with the needle, a yielding device for holding the moving means, and means pressing the templet toward the yielding means.

51. In combination, a sewing-machine having a reciprocating needle, a templet for holding fabric, means for moving the templet, said means including a member in alinement with the needle, a guiding element, a second guiding element with which the former guiding element coöperates, yielding means bearing against the former guiding element, and means bearing on the templet to press the latter toward the yielding means.

52. In combination, a sewing-machine having a reciprocating needle, a templet for holding fabric, means to move the templet intermittently a distance equal to the length of a stitch, said means including a member in axial alinement with the needle, mechanism continuously driven, and mechanism between the continuously-driven mechanism, and the means to move the templet to impart the intermittent motion to the templet.

53. In combination, a sewing-machine having a reciprocating needle, a carrier having a mutilated rack, a templet on the carrier, a gear engaging the rack, and means intermittently revolving the gear.

54. In combination, a sewing-machine having a reciprocating needle, a templet of arbitrary outline, means presenting the edge margin of the templet adjacent the needle, corner-guides against which the templet bears in its movement, and a spring-pressed arm holding the templet against the corner-guides.

55. In combination, a sewing-machine having a reciprocating needle, a templet of arbitrary outline, means feeding the edge of the templet adjacent the needle, adjustable means bearing on the templet for holding it in position against the feeding means, corner-guides against which the templet bears in its movement, and a spring-arm forcing the templet against the corner-guides.

56. In combination, a sewing-machine having a reciprocating needle, a templet of arbitrary outline, means for intermittently feeding and turning the templet to present the outer edge thereof to the needle means for guiding the templet, said means comprising a pin fitting in a groove, the pin being in alinement with the needle independent means acting on the templet to assist in its movement, continuously-operating mechanism adapted to impart the intermittent movement to the feeding means, and means for manually moving the templet independent of the continuously-operated mechanism.

57. In combination, a sewing-machine having a reciprocating needle, mechanism driving the sewing-machine, dual fabric-holders having a switch between them, mechanism moving the templet, and a connection between the switch and the driving mechanism, the driving mechanism being stopped when the switch contacts with the connection.

58. In combination, a sewing-machine having a reciprocating needle, a pressure-foot, a support, a templet, the edge of which is confined between the pressure-foot and support, and means for intermittently feeding the edge of the templet adjacent the needle, said means including a member in alinement with the needle.

59. In combination, a sewing-machine having a reciprocating needle, a templet comprising a plate and a clamp of arbitrary outline for presenting the edge margin of fabric to the needle, mechanism operating through the clamp to pick up and hold flat a piece of fabric and deposit same on the plate, and means for operating the templet.

60. In combination, a sewing-machine having a needle, a fabric-holding means of arbitrary outline adapted to be turned, means having a projection distanced from the center of the fabric-holding means for turning said holding means to present its edge adjacent the needle, the projection forming a guide and a pivot on which the fabric-holding means turns.

61. In combination, a sewing-machine having a needle, a fabric-holding means of arbitrary outline adapted to be turned, means distanced from the center of the fabric-holding means for turning said fabric-holding means to present its edge adjacent the needle, said means comprising a shaft and gears coöperating therewith, the center of the shaft being in axial alinement with the needle, and forming a pivot on which the fabric-holding means turns.

62. In combination, a sewing-machine having a needle, a fabric-holding means of arbitrary outline adapted to be turned, a groove formed in the fabric-holding means, said groove corresponding to the outline of the fabric-holding means, means distanced from the center of the fabric-holding means for turning it, a pin projecting from the means which turns the fabric-holding means, said pin engaging the groove, to guide the edge of the fabric-holding means adjacent the needle.

63. In combination, a sewing-machine having a needle, an elongated carrier, a fabric-holding means, a guide corresponding to the outline of the fabric-holding means, a pin engaging the guide a revolving device to present the edge of the fabric-holding means adjacent the needle, said pin serving as the point on which the fabric-holding means swings in turning corners.

64. In combination, a sewing-machine having a needle, a fabric-securing means, a guide of arbitrary outline, and means imparting motion to the carrier to present the fabric to the needle to receive stitches corresponding to the outline of the guide, a pin projecting from the center of said means said pin engaging the guide and being in alinement with the needle and serving as the point on which the fabric-holding means swings when turning.

65. The combination with a sewing-machine having a needle, of a fabric-holding means arranged for coöperation with the machine, means for feeding and turning the fabric-holding means, and guiding means corresponding to the outline of the fabric-holding means, said guiding means compelling the fabric-holding means to travel in a path corresponding with its outline.

66. The combination with a sewing-machine having a needle, of a fabric-holding means arranged for coöperation with the machine, means for operating the fabric-holding means, and means for guiding the fabric-holding means to compel its path of travel to correspond with its outline, said guiding means serving as a point on which the fabric-holding means turns in its travel.

67. The combination with a sewing-machine having a needle, of a fabric-holding means arranged for coöperation with the machine, means having its center in alinement with the needle for feeding and turning the holding means to present the edge of the fabric-holding means to the needle, and means for guiding the fabric-holding means to maintain its relative position with the needle during its travel.

68. In combination, a sewing-machine having a needle, a carrier provided with fabric-securing means, a continuous guide adjacent the edge of the carrier, a revolving mechanism for moving the carrier to present the fabric to the needle to receive stitches corresponding to the outline of the guide, an element central of the revolving mechanism which coöperates with the guide, and means imparting motion to the revolving mechanism.

69. In combination, a sewing-machine having a needle, a carrier provided with fabric-securing means, a guide of arbitrary outline, and means imparting motion to the carrier to present the fabric to the needle to receive stitches corresponding to the outline of the guide, and means serving as a pivot for the carrier.

70. In combination, a sewing-machine having a needle, duplicate fabric-holding means, a switching device between the duplicate fabric-holding means, means for guiding the edge of the fabric-holding means adjacent the needle, means for imparting intermittent motion to the fabric-holding means, and means for manually operating the fabric-holding means independent of the intermittent movement.

71. In combination, a sewing-machine having a needle, a fabric-holding means arranged for coöperation with the machine, means operating near the outer edge of the fabric-holding means for feeding and turning it, means for guiding the fabric-holding means to compel its path of travel to correspond with the outline of said fabric-holding means to stitch the edge margin of fabric to correspond to the outline of the guiding means.

72. In combination, a sewing-machine having a needle, a fabric-holding means comprising an upper and a lower plate, one of which is formed with an opening, means communicating with the opening for holding fabric to be operated upon, means for operating the fabric-holding means, and means for guiding the fabric-holding means to compel its path of travel to correspond to its outline.

73. In combination, a sewing-machine having a needle, a dual fabric-holding device arranged for coöperation with the sewing-machine, means for operating the fabric-holding means, means on the fabric-holding device for stopping the machine at determined points, and means for guiding the dual fabric-holding device to compel its path of travel to correspond to its outline.

74. In combination, a sewing-machine having a needle, a fabric-holding means arranged for coöperation with the machine, means for operating the fabric-holding means, means for guiding the fabric-holding means to compel its path of travel to correspond to its outline and means for pressing the fabric-holding means toward the guiding means.

75. In a sewing-machine, the combination with a needle, a support, a templet of arbitrary outline and adapted to be moved on the support, mechanism for intermittently moving the edge of the templet in the path of the needle, means for guiding the templet, said means comprising a pin fitting in a groove, the pin being in alinement with the needle and independent means acting on the templet to assist in its movement.

HENRY C. MILLER.

Witnesses:
ALEX. SELKIRK,
CHARLES SELKIRK.